United States Patent [19]

Landoll et al.

[11] Patent Number: 4,492,507

[45] Date of Patent: Jan. 8, 1985

[54] ACTUATOR FOR SHIFTABLE UNDERCARRIAGE OF TILTABLE TRAILER

[75] Inventors: Donald R. Landoll; David J. Kongs; Alfred R. Belknap, all of Marysville, Kans.

[73] Assignee: Landoll Corporation, Marysville, Kans.

[21] Appl. No.: 474,128

[22] Filed: Mar. 10, 1983

[51] Int. Cl.³ .................................. B60P 1/04
[52] U.S. Cl. .................................. 414/475; 280/80 B
[58] Field of Search ............... 414/474, 475, 482, 484, 414/485; 280/80 B, 81 R, 43, 43.23

[56] References Cited

U.S. PATENT DOCUMENTS

| | | | |
|---|---|---|---|
| 2,753,064 | 7/1956 | Lesser | 414/475 |
| 2,788,145 | 4/1957 | Clark | 414/484 |
| 3,209,850 | 10/1965 | Fish | 280/81 R X |
| 3,685,853 | 8/1972 | Goldsmith | 280/81 R |
| 3,981,408 | 9/1976 | Chisum | 414/475 |
| 4,026,429 | 5/1977 | Rummell | 414/786 |
| 4,125,198 | 11/1978 | Landoll | 414/484 |
| 4,209,278 | 6/1980 | Cooper et al. | 414/482 X |
| 4,231,710 | 11/1980 | Landoll | 414/475 |

Primary Examiner—Joseph E. Valenza
Assistant Examiner—David A. Bucci
Attorney, Agent, or Firm—Schmidt, Johnson, Hovey & Williams

[57] ABSTRACT

A control assembly for shifting the undercarriage of a trailer to a position permitting tilting of the bed for facilitating loading of cargo has a relatively long stroke such as to appreciably decrease the slope of the bed when in its tilted position with the undercarriage disposed forwardly remote from its normal roading position. The assembly permits the loading of cargo which would otherwise require additional ramps needed also in certain instances to compensate for overhang.

14 Claims, 17 Drawing Figures

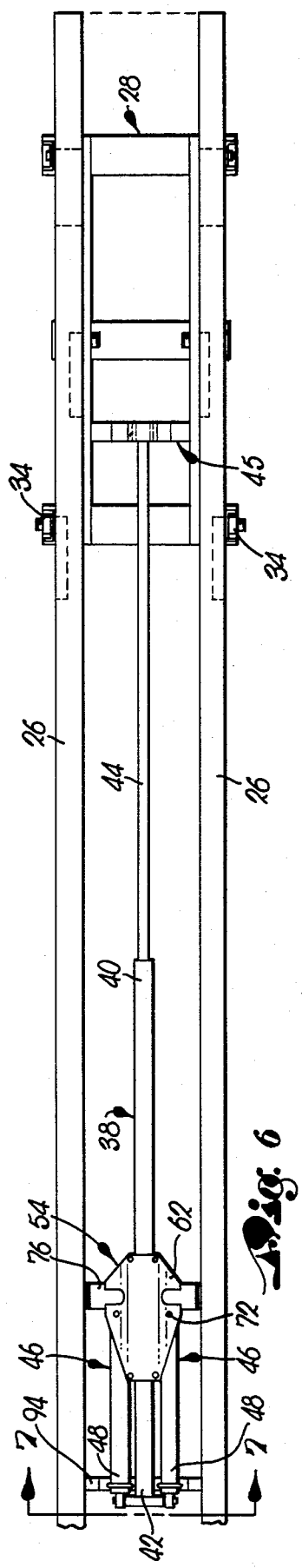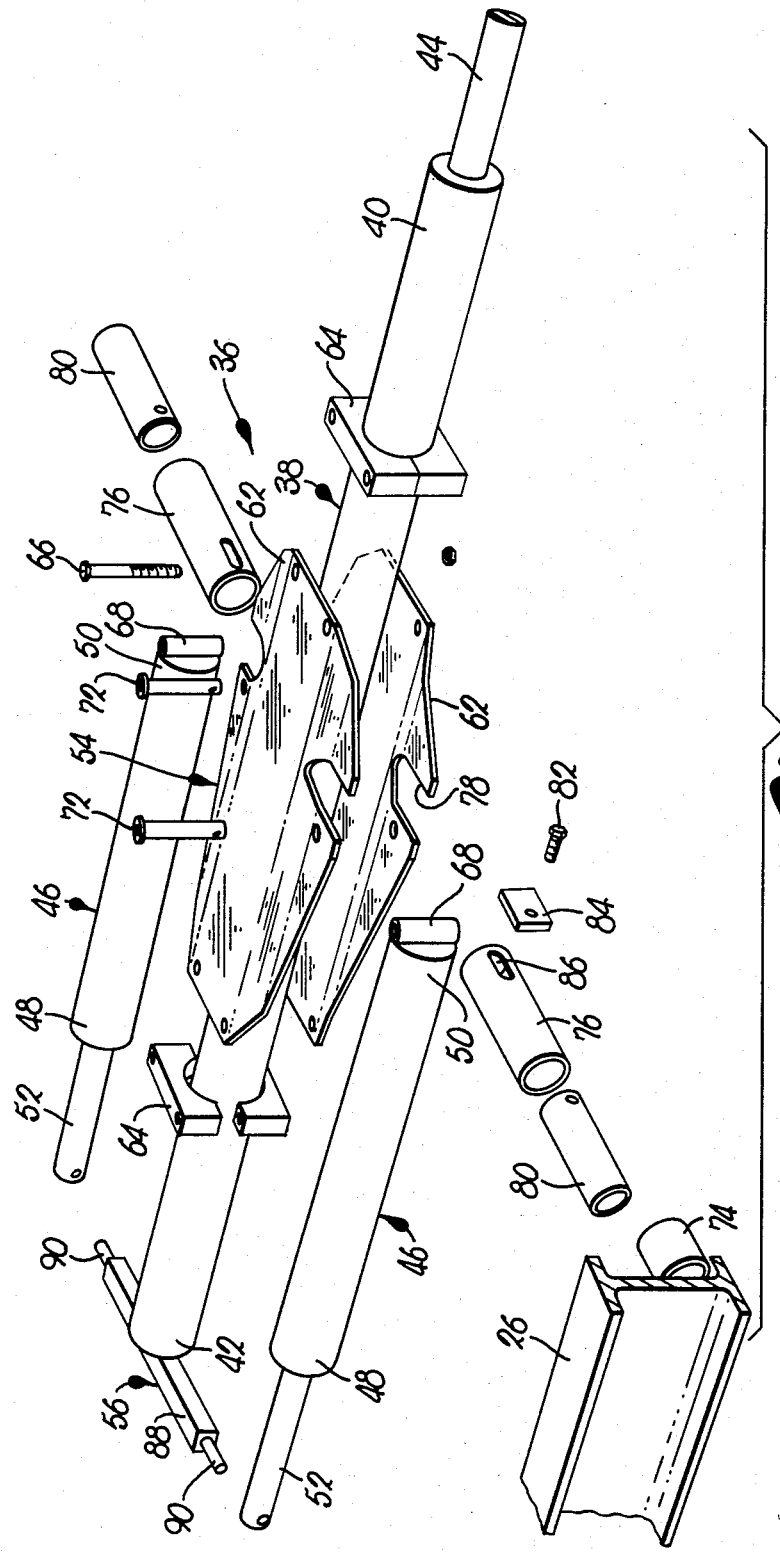
Fig. 6
Fig. 8

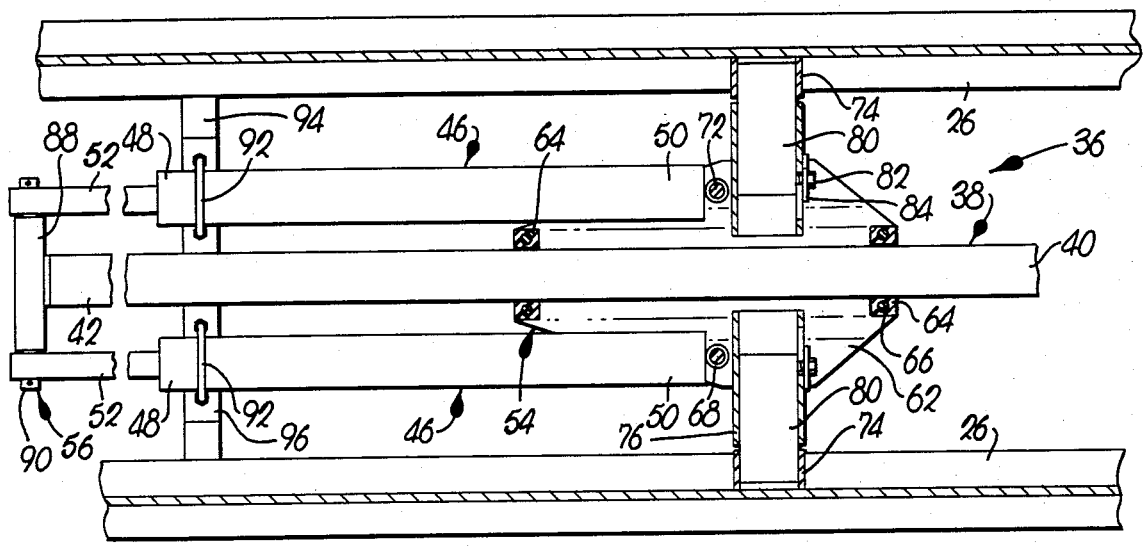
Fig. 11
Fig. 10
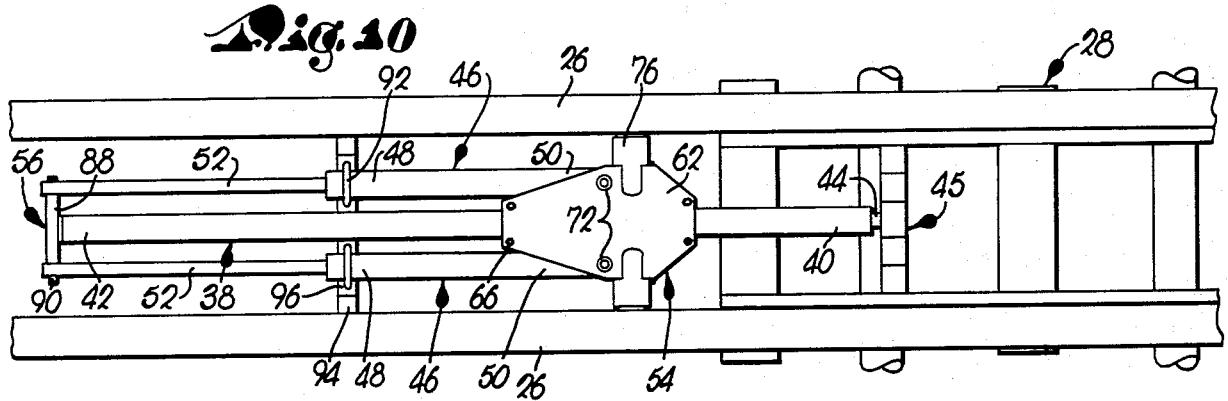
Fig. 12
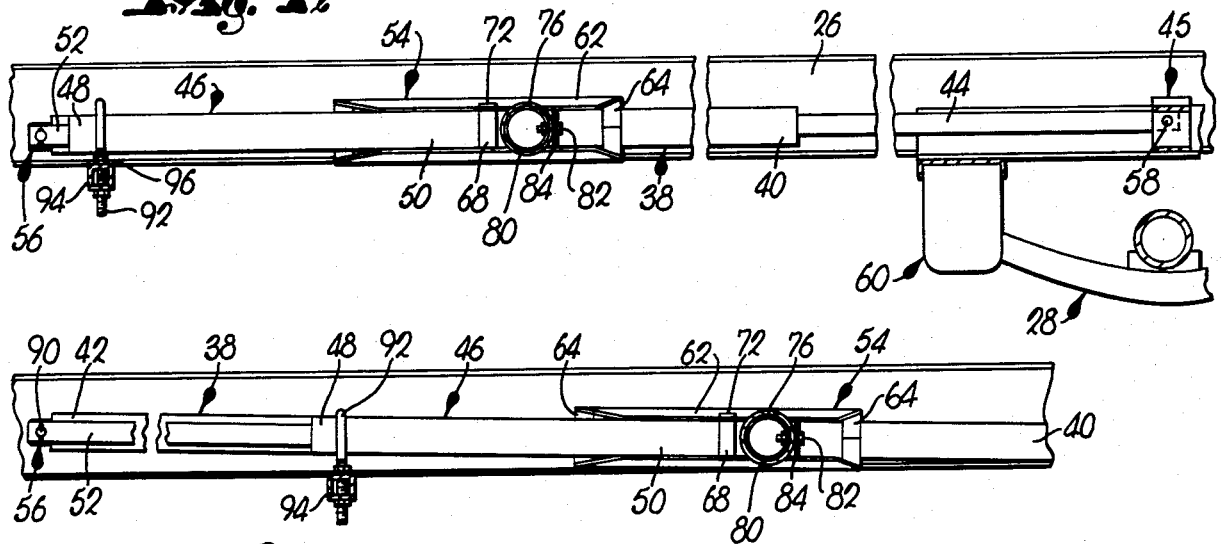
Fig. 13

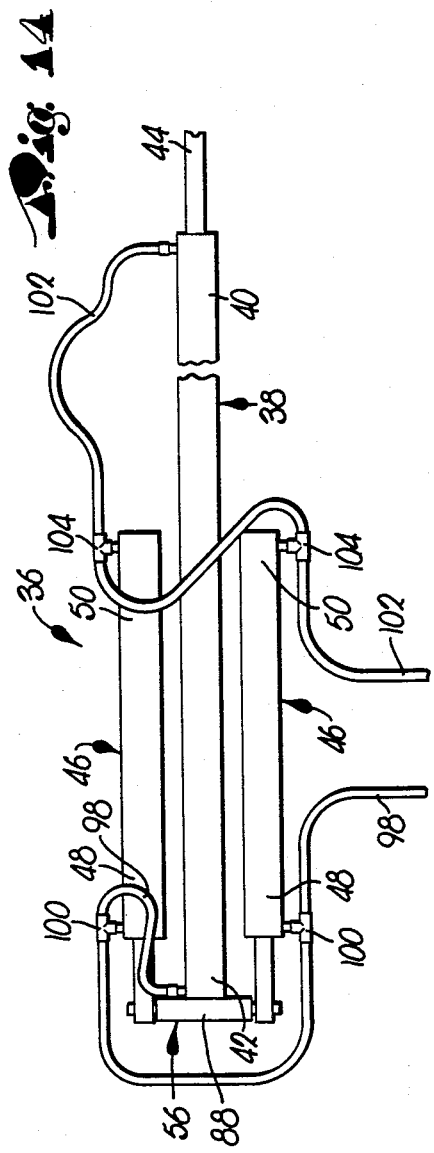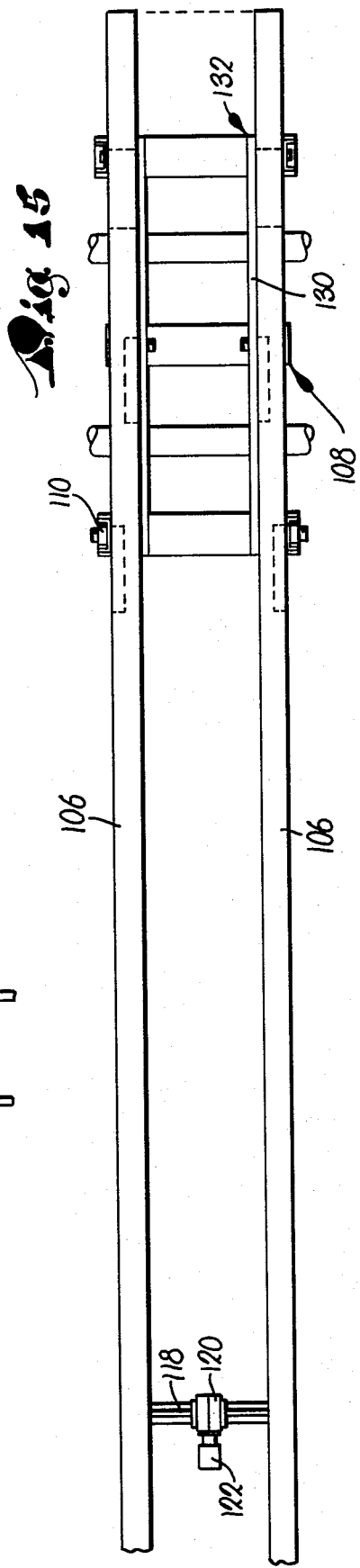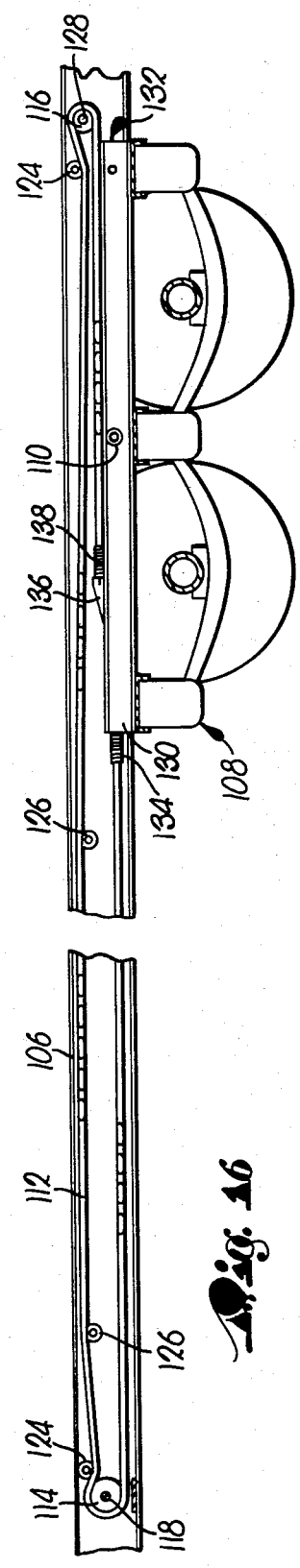

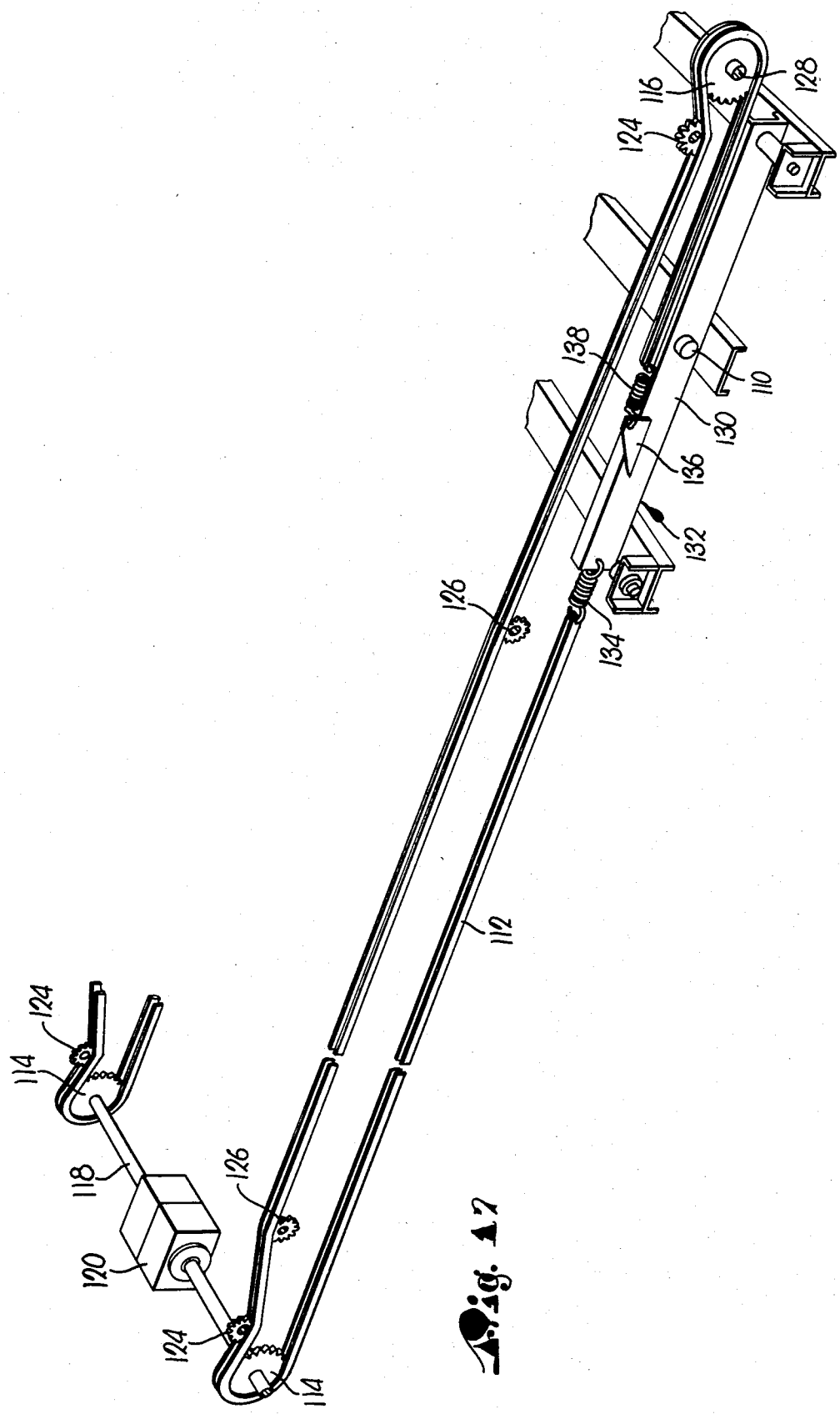

ACTUATOR FOR SHIFTABLE UNDERCARRIAGE OF TILTABLE TRAILER

The present invention relates to improvements in the undercarriage control disclosed in U.S. Pat. No. 4,125,198 of Nov. 14, 1978 as is also incorporated in the invention of U.S. Pat. No. 4,231,710 dated Nov. 4, 1980. There is provided therein a single, relatively long, hydraulic cylinder beneath the bed of the trailer for shifting the undercarriage forwardly from its normally rearmost roading position to a position permitting tilting of the bed, thereby bringing the rear end of the inclined bed close to the ground.

For most types of cargo, such as tractors, farm implements and many other types of equipment to be transported, the undercarriage control of said patents has been quite satisfactorily and successfully commercialized for several years. However, loading and unloading certain kinds of cargo is somewhat difficult because of the rather steep angle of the tilted bed. Also, in many such instances ramps must be added at the rear of the trailer.

While a simple solution to the problem might appear to be the mere lengthening of the stroke of the cylinder such expedient is quite unsatisfactory because of strength and stability. Needed is an increase in undercarriage travel from about 10' 6", for example, to a stroke of about 14'. Such 42" additional stroke for the cylinder of said patents would create many unacceptable problems of cylinder vibration during over-the-road travel, breakage and inadequate power for shifting the undercarriage, especially when considering the heaviness of many kinds of cargo on the bed.

Therefore, without sacrificing the many advantages of the trailers disclosed in said patents, and without need for change other than in the undercarriage control, we have provided an improved control capable of effecting the full 14' stroke without need for lengthening the main cylinder connected to the undercarriage.

In one form of the instant invention a pair of secondary cylinders are added to actuate the main cylinder as a unit thereby shifting the undercarriage an initial distance, for example, of 42". The main cylinder is thereupon actuated automatically to shift the undercarriage an additional distance of 10' 6". This decreases the bed angle from 11° to 8° permitting the loading of any standard 40 foot bus without added ramps to compensate for overhang. Small industrial trucks can also be ground loaded without need for ramps. In the drawings:

FIG. 6 is a fragmentary plan view of the trailer framework, the undercarriage and the control, all in the normal roading position;

Figure 9:
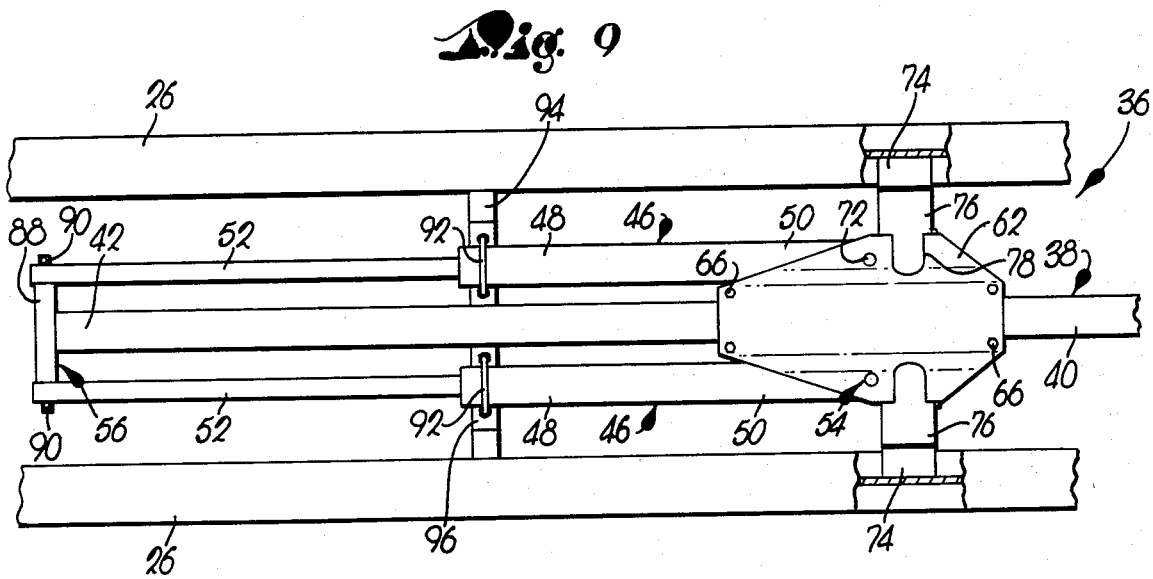

FIG. 8. is an enlarged, fragmentary exploded view of the undercarriage control;

FIG. 9 is an enlarged, fragmentary view similar to a portion of FIG. 6 but with the piston rods of the secondary hydraulic units extended;

FIG. 10 is a view similar to FIG. 9 but showing the undercarriage fragmentarily in its forwardmost position;

FIG. 11 is a view similar in part to FIG. 9, further enlarged, parts being broken away and in section for clearness;

FIG. 12 is a side elevational view of the control with the undercarriage shown fragmentarily in its rearmost position;

FIG. 13 is a view similar to FIG. 12 showing the secondary units the same as in FIG. 9;

FIG. 14 is a view showing the hydraulic circuit of the control illustrated in FIGS. 5–13;

FIG. 15 is a view, in part somewhat the same as FIG. 6 showing a modified form of undercarriage control;

FIG. 16 is a vertical cross-sectional view showing the control of FIG. 15; and

FIG. 17 is a fragmentary perspective view of the control shown in FIGS. 15 and 16.

The above-mentioned U.S. Pat. No. 4,125,198 is incorporated herein by reference for a full understanding as needed of the concepts of the present invention.

As in said patent, referring first to FIGS. 1–4, a trailer 18 has an elongated, tiltable bed 20 provided with a deck 22 and an underlying deck-supporting frame 24 which includes a pair of elongated, transversely spaced, longitudinally extending, parallel I-beams 26, although other types of frames may be employed. The bed 20 is tiltable from the normally horizontal, roading position shown in FIG. 1 to the tilted position shown in FIG. 2.

A wheeled, bed-supporting undercarriage 28 beneath the bed 20 is normally disposed adjacent the rear end of the bed 20 (FIG. 1) and is shiftable forwardly relative to the frame 24 longitudinally thereof from said rear end to the bed-tilting position (FIG. 2) intermediate the ends of the bed 20.

Figure 1:
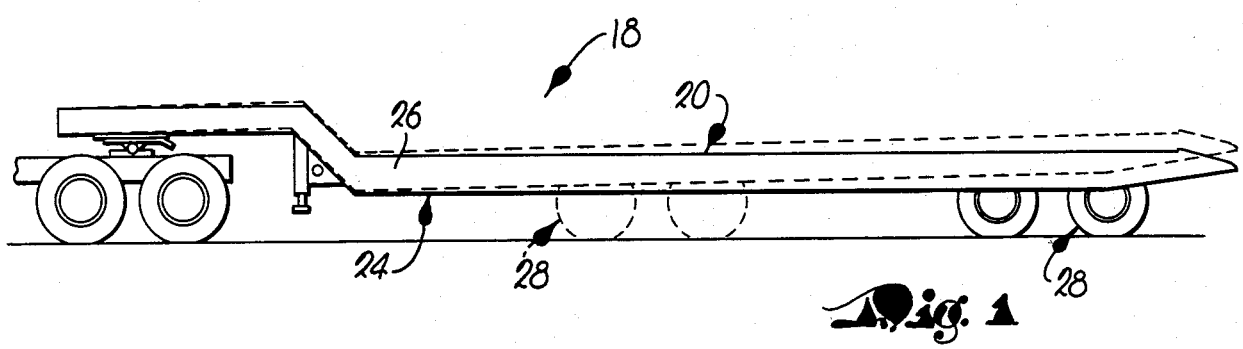
FIG. 1 is a side elevational view of a tiltable trailer provided with a shiftable undercarriage made pursuant to our present invention, showing the same in its roading position.
Figure 2:
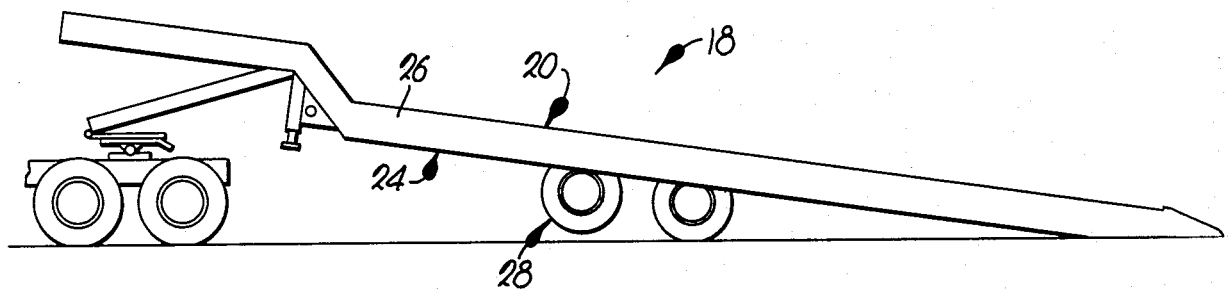
FIG. 2 is a side elevational view of the trailer tilted with its undercarriage shifted forwardly.
Figure 3:
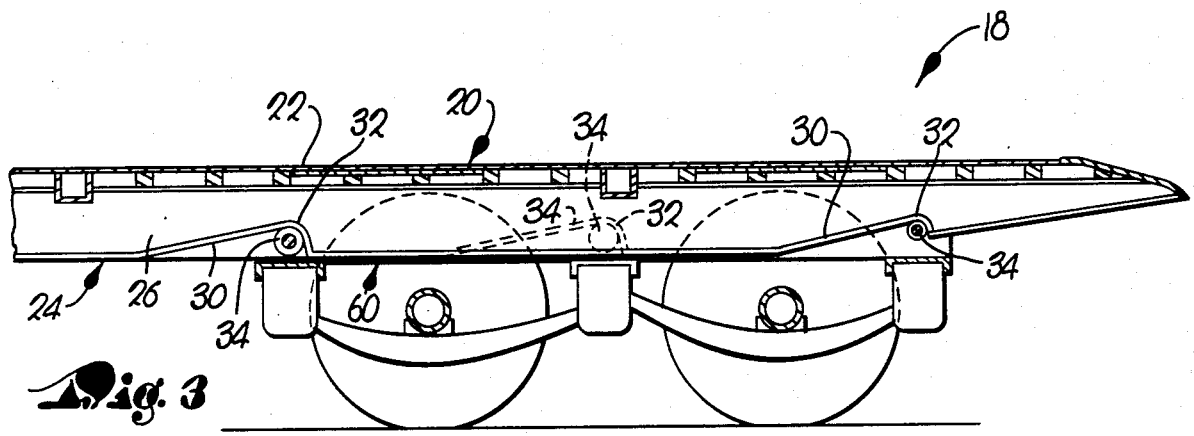
FIG. 3 is an enlarged fragmentary view partially in section with the undercarriage in its rearmost position.
Figure 4:
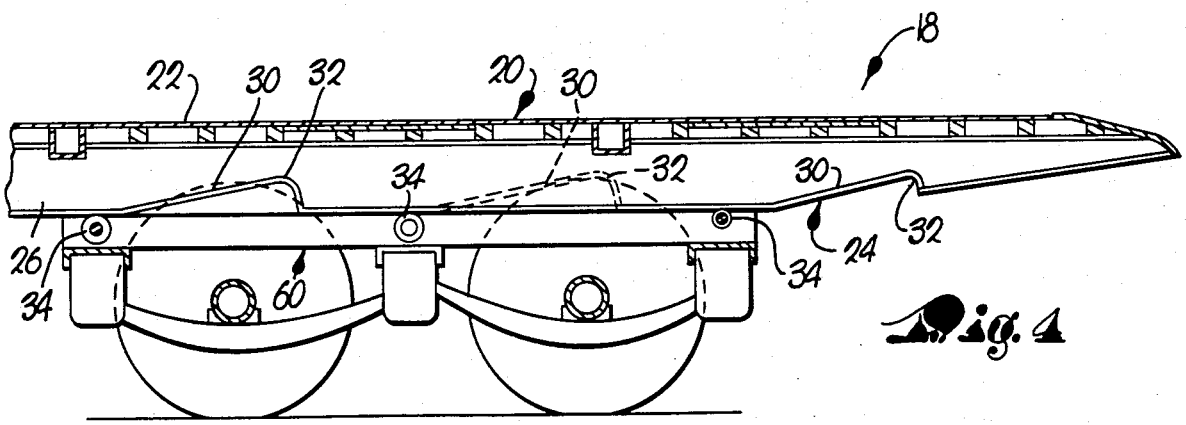
FIG. 4 is a view similar to FIG. 3 showing the bed raised as the undercarriage is shifted partially away from its roading position.
Figure 5:
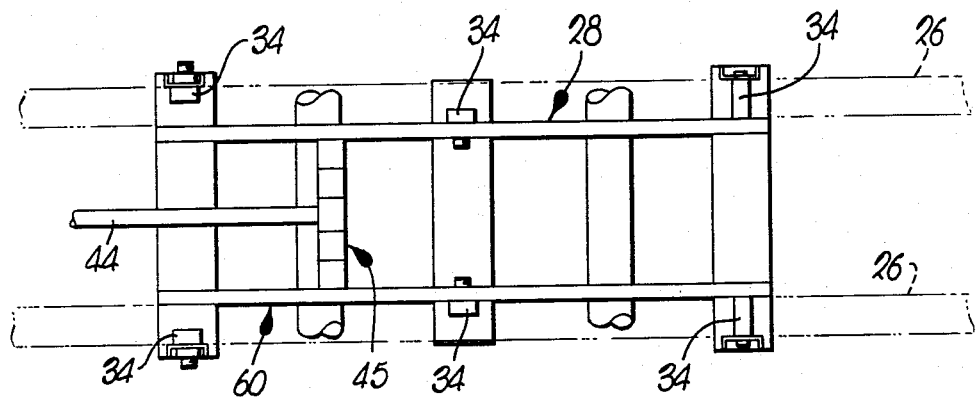
FIG. 5 is a fragmentary top view of the undercarriage chassis showing its pivotal coupling with the piston rod of the primary undercarriage control.
Figure 7:
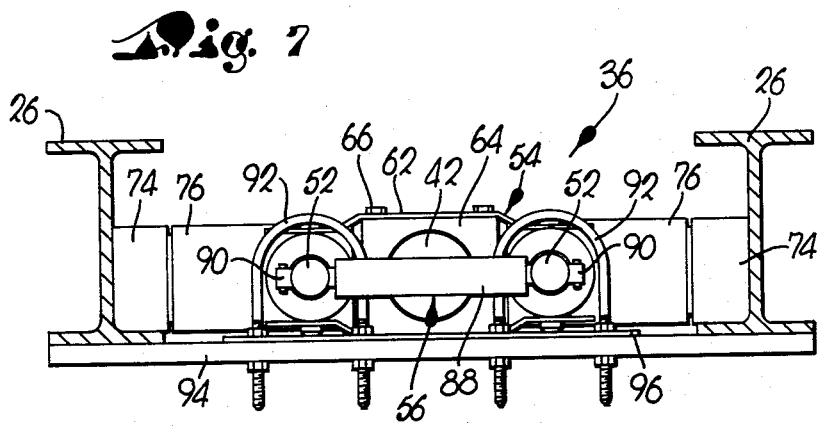
FIG. 7 is an enlarged, vertical cross-sectional view through the frame showing the forwardmost end of the undercarriage control.

Each beam 26 has a number of ramps 30 terminating in seats or pockets 32 for receiving rollers 34 on the undercarriage 28 such that the rear end of the bed 20 is lowered when the undercarriage 28 is in its normal rearmost position as shown by the full and dotted lines in FIG. 1.

Our instant invention relates to an improved undercarriage control assembly 36 beneath the bed 20 operably interconnecting the bed 22 and the undercarriage 28 for shifting the latter fore and aft.

Referring now to the embodiment of FIGS. 5–14, the assembly 36 includes a primary, fluid pressure (preferably hydraulic) piston and cylinder unit 38 having an elongated, longitudinally reciprocable cylinder 40 provided with a forward butt end 42 and a reciprocable, rearwardly extensible piston rod 44 at the rear gland end of the cylinder 40. A coupling 45 attaches the rod 44 to the undercarriage 28.

The assembly 36 also includes a pair of shorter, secondary, fluid pressure (hydraulic) piston and cylinder units 46 of identical nature, each having an elongated, longitudinally disposed cylinder 48 provided with a rear butt end 50 and a reciprocable, forwardly extensible piston rod 52 at the forwardmost end of its cylinder 48. Structure 54 attaches the butt ends 50 to the frame 24 and apparatus 56 brackets the butt end 42 to the rods 52.

The coupling 45 has a transverse pivot pin 58 (FIG. 12) connecting the rod 44 to a chassis 60 forming a part of the undercarriage 28, permitting up and down swinging movement of bed 20 as the rollers 34 enter and roll out of the pockets 32.

The structure 54 includes a pair of identical, horizontal plates 62 between the beams 26 having the cylinder 40 disposed therebetween. They are held vertically spaced by front and rear, slide housing supports 64 for the main undercarriage cylinder 40. The two sections of each support 64, disposed between the plates 62, are joined together and connected to the plates 62 by fasteners 66. They are preferably made from an elastomer such as is available under the trademark Nylatron to provide a low friction support for the cylinder 40 as it reciprocates fore and aft within the supports 64.

The cylinders 48 are also partially disposed between the plates 62, one along each side respectively of the unit 38, and are provided with tubes 68 rigid to their butt ends 50 for receiving upright pins 72 passing through the plates 62.

The plates 62 are carried on the beams 26 by a trunnion system having opposed journals including short, outer tubes 74 rigid to the beams 26, longer, inner tubes 76 rigid to the plates 62 (within notches 78) and tubes 80 telescoped within the corresponding tubes 74 and 76. Fasteners 82 pass through washers 84, thence through slots 86 in the tubes 76 and then into the tubes 80. Hence, the tubes 80 may shift along the tubes 74 and 76. Moreover, the plates 62 and the tubes 76, 80 may rotate relative to the tubes 74, permitting up and down swinging movement of the bed 20, made possible by the pivot pin 58 of the coupling 45.

The bracketing apparatus 56 includes a crossbar 88 rigid to butt end 42 and provided with reduced diameter ends 90 passing through the rods 52 at their forward free ends. The pivot system for the triple undercarriage slide arrangement is important to the trouble-free operation of the undercarriage control, allowing for maximum undercarriage travel with minimum cylinder rod deflection.

Additionally, U-bolt stabilizers 92 are incorporated into the triple cylinder configuration at the gland ends of the cylinders 48 to serve as plane guides for longitudinal movement of the cylinder 40. A cross member 94 beneath the cylinders 40 and 48 is secured to the beams 26 and the U-bolts 92, looped over the cylinders 48, are adjustably attached to the member 94. The cylinders 40 and 48 are protected by an underlying, elastomeric pad 96 secured to the member 94. Moveover the U-bolts 92 are coated with a suitable material (such as rubber) to prevent metal to metal contact with the cylinders 48 adjacent their gland ends.

The hydraulic circuit for the assembly 36, as shown in FIG. 14, includes a line 98 feeding to and from the butt end 42 of the cylinder 40 and branching at 100 to the gland ends of the cylinders 48. A second line 102 feeds to and from the gland end of the cylinder 40 and branching at 104 to the butt ends 50 of the cylinders 48. Manual valving (not shown) controls flow of fluid between the pump and the fluid reservoir of the hydraulic system.

Flow of fluid in the line 102 to the branches 104 and into the cylinders 48 causes extension of the rods 52 to exert a pull on the unit 38, it being understood that when the undercarriage 28 is in the roading position shown in full lines by FIG. 1, the rod 44 is fully extended as shown in FIG. 6. The shorter cylinders 48 activate first because of the larger combined piston surface. This creates a greater initial thrust to pull the undercarriage 28 from the pockets 32 in the beams 26. Thus, the bed 20 rises from the position shown in FIG. 3 to the position shown in FIG. 4, all made possible by the pivot pin 58 and the trunnion system 74–86.

Assuming, for example, a 42" stroke for the cylinders 48, the undercarriage 28 will be moved forwardly to that extent before the fluid in the line 102 commences to flow into the cylinder 40 to retract the rod 24 from the position shown in FIG. 6. Assuming, for example, a 10' 6" stroke for the cylinder 40, the total forward movement of the undercarriage 28 to the position shown in FIG. 2 will be 14'. The load angle in FIG. 2 will, therefore, be 8° as distinguished from an 11° load angle if the unit 38 were used in absence of the secondary units 46.

Conversely, flow of fluid into the line 98 to the branches 100 and into the cylinders 48 causes retraction of the rods 52 to exert a push on the unit 38 for partial return of the undercarriage 28 toward its roading position. After full retraction of the rods 52, the fluid will flow from the line 98 into the cylinder 40 at its butt end 42 to extend the rod 44 and thereby replace the undercarriage 28 into its roading position, all the while tilting the bed 20 back to its horizontal position.

In the embodiment of our invention depicted by FIGS. 15–17 a pair of spaced I-beams 106, not unlike the beams 26, are supported by an undercarriage 108 through use of rollers 110 the same as above described in connection with the control assembly 36 of FIGS. 1–14.

Each beam 26 houses a chain 112 which meshes with a front sprocket wheel 114 and a rear sprocket wheel 116. The two wheels 114 are rigidly secured to a cross shaft 118 rotatably supported by the beams 106, the shaft 118 passing through a gear box 120 driven by a suitable prime mover 122, both supported by the beams 106. Each beam 106 carries a pair of spaced, idler sprocket wheels 124 in mesh with and overlying the upper stretch of the corresponding chain 112 and a pair of spaced, idler sprocket wheels 116 in mesh with and underlying the upper stretch of the corresponding chain 112. The wheels 116 are provided with a cross shaft 128 supported by the beams 106.

The lower stretch of each chain 112 has an elongated bar 130 interposed therein and forming a part of chassis 132 of the undercarriage 108. One end of the chain 112 is attached to the forward end of the bar 130 by a spring 134 and a bracket 136 rigid to the bar 130 intermediate its ends serves to attach the opposite end of the chain 112 through use of a second spring 138.

During actuation of the prime mover 122 to reciprocate the undercarriage 108, the chains 112 are adequately stabilized by the idlers 124 and 126 and the chains 112 are kept taut by the springs 134 and 138 which also serve to avoid sudden shock on the chains 112 during commencement of the drive of the shaft 118 in either of two directions through the gear box 120. The springs 134 and 138 also protect the chains 112 against damage in the event of temporary increased loads, such as binding friction, which might affect free fore and aft rolling movement of the undercarriage 108 relative to the beams 106. Manifestly, the control of FIGS. 15–17 permits the beams 106 to rise and fall freely relative to the rollers 110 on the chassis 132.

We claim:

1. In combination with a trailer having an elongated, tiltable bed provided with a deck and an elongated, underlying deck-supporting frame, said bed being normally disposed in a substantially horizontal, roading position, and a wheeled, bed-supporting undercarriage beneath the bed and normally disposed adjacent the rear end of the bed, said undercarriage being shiftable forwardly relative to the frame longitudinally thereof from said rear end to a bed-tilting position intermediate the front and rear ends of the bed,
   an undercarriage control assembly beneath the bed for shifting the undercarriage fore and aft, said assembly including:
      support structure suspended from the frame adjacent said front end of the bed;
      a double acting, primary, fluid pressure piston and cylinder unit having an elongated cylinder carried by said structure for fore and aft reciprocation longitudinally of the frame,
      said cylinder having a forwardmost butt end and a reciprocable, rearwardly extensible piston rod at the rearmost end of the cylinder;
      a coupling attaching the rod to the undercarriage;
      a pair of double acting, secondary, fluid pressure, piston and cylinder units alongside the primary unit, each having an elongated cylinder provided with a rearmost butt end and a reciprocable, forwardly extensible piston rod at the forwardmost end of its cylinder;
      means attaching the butt ends of the cylinders of the secondary units to said structure; and
      apparatus connecting the butt end of the cylinder of the primary unit to the rods of the secondary units whereby, upon application of fluid pressure to the cylinders, the rods of the secondary units first shift the primary unit and the undercarriage fore and aft a predetermined distance and, thereupon, the rod of the primary unit shifts the undercarriage fore and aft an additional distance.

2. The invention of claim 1; and cylinder support means on the frame underlying the cylinders forwardly of said structure.

3. The invention of claim 2; and means on said support means limiting the extent of upward movement toward the frame of the cylinders of the secondary units.

4. The invention of claim 1, said structure having a pair of longitudinally spaced, low friction housings slidably receiving the cylinder of the primary unit.

5. The invention of claim 1, said apparatus including a crossbar having the butt end of the cylinder of the primary unit rigidly secured thereto intermediate the ends of the crossbar.

6. The invention of claim 1, said structure being swingably mounted on the frame and said coupling pivotally attaching the rod of the primary unit to the undercarriage, permitting the bed to rise and fall during shifting of the undercarriage.

7. The invention of claim 6, said structure including a pair of vertically spaced plates provided with a trunnion system swingably mounting the same on the frame.

8. The invention of claim 7, the cylinders being interposed between the plates.

9. The invention of claim 8, there being a pair of longitudinally spaced, low friction housings secured to the plates therebetween and slidably receiving the cylinder of the primary unit.

10. The invention of claim 9, said system including a pair of opposed journals secured to the plates and extending radially in opposite directions from the cylinder of the primary unit.

11. The invention of claim 10, each journal including relatively rotatable, telescoped tubes shiftable relatively between the plates and the frame.

12. The invention of claim 11, the butt ends of the cylinders of the secondary units being attached to the plates adjacent the journals with the cylinder of the primary unit disposed therebetween.

13. The invention of claim 12, and stabilizing means of the cylinders carried by the frame at the forwardmost ends of the cylinders of the secondary unit.

14. The invention of claim 13, said apparatus including a crossbar having the butt end of the cylinder of the primary unit rigidly secured thereto intermediate the ends of the crossbar.

* * * * *